Nov. 25, 1924.
C. D. McARTHUR
1,516,975
JOINT FOR FURNITURE AND THE LIKE
Filed Nov. 3, 1923
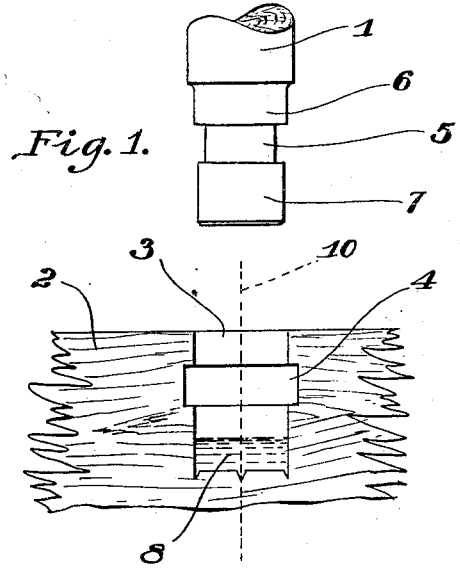
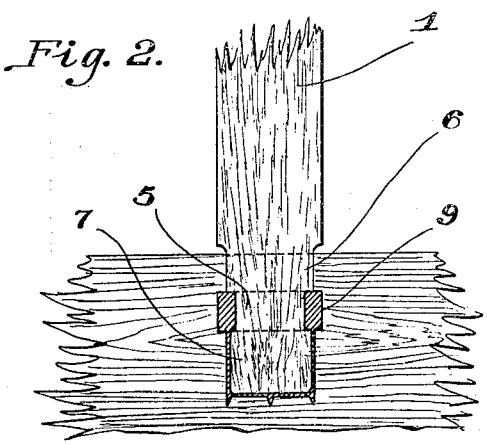
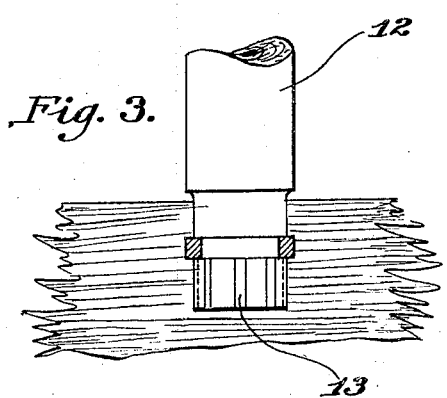
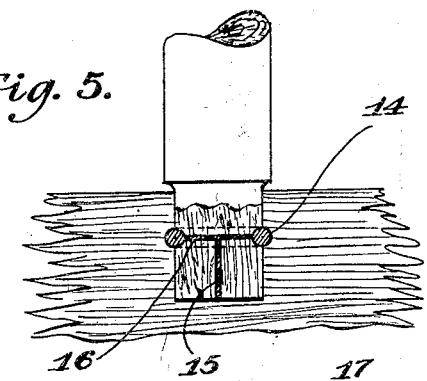
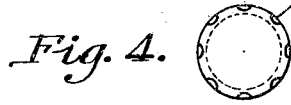
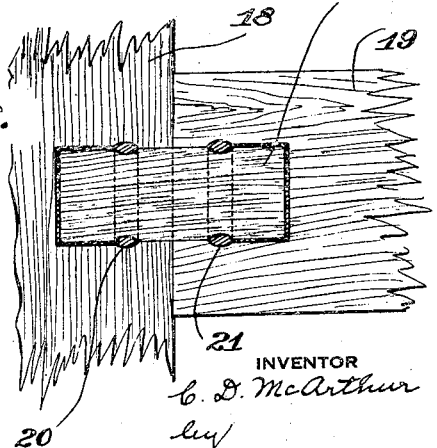
INVENTOR
C. D. McArthur
by
James C. Bradley
Atty Patented Nov. 25, 1924.

1,516,975

UNITED STATES PATENT OFFICE.

CHARLES D. McARTHUR, OF PITTSBURGH, PENNSYLVANIA.

JOINT FOR FURNITURE AND THE LIKE.

Application filed November 3, 1923. Serial No. 672,497.

*To all whom it may concern:*

Be it known that I, CHARLES D. MCARTHUR, a citizen of the United States, and a resident of Pittsburgh, in the county of Allegheny and State of Pennsylvania, have made a new and useful invention in Improvements in Joints for Furniture and the like, of which the following is a specification.

The invention relates to a joint for furniture of the socket and tenon type. It has for its objects the provision of an improved joint, which is no more expensive than the ordinary socket and tenon glue joint, but which is very much stronger than such old form of joint, and which will securely hold the parts together after a long period of use, and after the glue has lost the major part of its holding power. Briefly stated, this result is secured by grooving the wall of the socket and tenon, and providing in this groove a locking ring of glue or cement. Heretofore, joints with somewhat similar grooves have been employed in connection with locking rings of fusible metal, but such joints are expensive and difficult to make because of the tendency of the metal to solidify before it has completely filled the locking grooves, unless the wood is maintained at a high temperature, and this is a matter of inconvenience and trouble. Further, a joint employing metal locking rings, depends entirely upon such rings for its security, and the joint becomes very loose when the socket member or tenon shrinks. My construction overcomes these objections, as the glue, which forms the locking rings, can be applied in the same manner as in an ordinary glued joint, and when so applied, the glue, not only acts as a positive lock, when it hardens in the locking grooves, but also holds the parts with great security because of its adhesive strength, so that the joint has a two fold holding power. The adhesive effect of the glue also tends to prevent, and does prevent, the shrinking away of the walls of the socket from the tenon, so that the joint remains tight much longer than is the case where a nonadhesive metallic filler with locking means is used, instead of the glue.

A further object of this invention is the provision of a locking ring of cross section such as to give a maximum holding effect, and obviate any tendency of the ring to split the wood, due to a wedging effect. Certain embodiments of the invention are illustrated in the accompanying drawings wherein:

Figure 1 is a partial side elevation and partial section showing the parts of the joint before the tenon is inserted into the socket. Fig. 2 is a section through the parts as assembled. Figs. 3, 5 and 6 are sections through modified forms of construction. And Fig. 4 is an end view of the tenon of Fig. 3.

Referring to Figs. 1 and 2, 1 is the tenon member, and 2 is the socket member having the socket 3 and the groove 4 in the wall of the socket. The tenon has a groove 5 with the portion 6 lying above the groove of a diameter such that it fits snugly in the socket, and the portion 7 lying below the groove of a diameter such that it fits loosely in the lower portion of the socket, as indicated in Fig. 2. In assembling the joint, a body of glue 8 is introduced into the bottom of the socket, as indicated in Fig. 1, and the tenon then pressed down into the socket, as indicated in Fig. 2. This forces the glue up around the lower portion 7 of the tenon, and into the locking grooves, thus providing the locking ring 9. Some of the glue also penetrates or is drawn by capillary attraction up between the portion 6 of the tenon and the opposing wall of the socket, the film of glue being so thin however that it is not indicated on the drawing. The loose fit of the lower portion of the tenon in the socket, permits the glue to flow up freely, so that it completely fills the locking grooves.

The locking ring is preferably rectangular in cross section, with its outer end wall at right angles to the center line 10 of the socket, as a ring of this kind, presenting, as it does, a square shoulder opposing the outward movement of the tenon, avoids any wedging effect tending to split the wood, such as is the case with a ring, which has an inclined or curved outer shoulder. This is of considerable importance where the tenon is exposed to a heavy strain tending to withdraw it from the socket, as for instance in the securing of golf shafts in the sockets of the heads, wherein the socket wall is relatively thin, and therefore more readily subject to spreading or splitting, when under a wedging strain tending to spread the socket member.

Substantially no additional expense is involved in making this joint over the ordinary smooth joint, as the spindle member is formed by turning and by the use of tools which can be shaped to form the groove and reduced lower end as the entire article is turned up. Similarly, the socket is formed by a special tool, which is attached to the ordinary boring tool, and which acts to cut the groove 4, as soon as the socket is completed.

The glue or adhesive cement which is employed is preferably a heavy wood glue which is given additional body by the use of a filler, such as white lead. Such a glue has great holding power, due to its adhesive character, and at the same time it forms a superior locking ring as it dries and hardens with a minimum amount of shrinkage. I have found that a glue of this kind, when dried completely fills the locking ring and provides a lock of greater strength than the wood, even after the passage of a long period and when subject to strain and vibration, which would destroy an ordinary glue joint and would loosen a tenon in a metallic lock setting. In so far as I am aware, ordinary cabinet maker's glue, which is relatively heavy, or which contains filler as heretofore specified is by far the best holding material available, but other adhesive cements might be used, and it will be understood that the term "glue" is used in the broad sense to cover all adhesive cementing materials suitable for use in securing wood members together.

Fig. 3 illustrates a modification in which the tenon member 12 is provided with the grooves 13 for the passage of the glue to the locking recess, instead of making the lower end of the member of reduced diameter, as is done in the preferred construction. This construction is satisfactory but more expensive than the one of Figs. 1 and 2.

Fig. 5 illustrates a modification, in which still another means is provided for permitting the passage of the glue from the bottom of the socket to the locking recess 14. This means comprises a central passage 15, communicating with a transverse passage 16 leading to the locking recess. This is also more expensive than the preferred construction, and the locking recess of circular cross section is less desirable than the one of rectangular cross section, because of the wedging tendency of the ring when force is applied tending to pull the tenon from its socket.

Fig. 6 illustrates the construction of Figs. 1 and 2 applied to a dowel connection. In this construction, 17 is the dowel pin or tenon (using such term in its broad sense) and 18 and 19 are the two socket members to be secured together. The ends of the dowel pin are of reduced diameter to permit the passage of the glue to the locking recesses 20 and 21.

What I claim is:

1. In combination in a joint, a wood member provided with a socket having a circumferential groove in its wall intermediate its ends, a tenon member of wood in the socket provided with a circumferential groove intermediate its ends in opposition to the groove in the socket member, and having the portion thereof on the outer side of the groove of less diameter than the portion on the inner side of the groove and fitting the socket loosely, and a body of glue between the walls of the socket and those of the tenon member and filling the said grooves to provide a locking ring.

2. In combination in a joint, a wood member provided with a socket having a circumferential groove in its wall intermediate its ends, a tenon member of wood in the socket, having its end portion fitting loosely in the socket and another portion outward from such end portion fitting the socket snugly, with a circumferential groove between the two portions in opposition to the groove in the socket member, and a body of glue between the walls of the socket and those of the tenon member and filling the said grooves to provide a locking ring.

In testimony whereof, I have hereunto subscribed my name this 31st day of October, 1923.

CHARLES D. McARTHUR.